(12) United States Patent
Imamori et al.

(10) Patent No.: US 11,657,939 B2
(45) Date of Patent: May 23, 2023

(54) MAGNETIC FIELD GENERATOR, METHOD FOR MANUFACTURING MAGNETIC FIELD GENERATOR, AND LINEAR MOTOR USING MAGNETIC FIELD GENERATOR

(71) Applicant: FUJI ELECTRIC CO., LTD., Kawasaki (JP)

(72) Inventors: Satoshi Imamori, Hino (JP); Terukazu Akiyama, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/582,831

(22) Filed: Jan. 24, 2022

(65) Prior Publication Data
US 2022/0293320 A1 Sep. 15, 2022

(30) Foreign Application Priority Data
Mar. 9, 2021 (JP) .............................. JP2021-037695

(51) Int. Cl.
*H01F 7/02* (2006.01)
*H01F 41/02* (2006.01)
*H02K 41/03* (2006.01)

(52) U.S. Cl.
CPC ....... *H01F 7/0242* (2013.01); *H01F 41/0253* (2013.01); *H02K 41/031* (2013.01)

(58) Field of Classification Search
CPC .. H01F 7/0242; H01F 41/0253; H01F 1/0536; H01F 7/0273; H01F 41/0293; H02K 41/031; H02K 1/2783
See application file for complete search history.

(56) References Cited

U.S. PATENT DOCUMENTS

| 10,475,561 | B2 | 11/2019 | Sagawa et al. |
| 2012/0299398 | A1 | 11/2012 | Morimoto |
| 2016/0300649 | A1 | 10/2016 | Sagawa et al. |

FOREIGN PATENT DOCUMENTS

| EP | 1746611 A1 * | 1/2007 | ................ B22F 3/24 |
| JP | 2009-106037 A | 5/2009 | |
| JP | 2010-136516 A | 6/2010 | |
| JP | 2013-243886 A | 12/2013 | |
| JP | 2014-516236 A | 7/2014 | |
| JP | 2015-171285 A | 9/2015 | |
| JP | 2017-224831 A | 12/2017 | |

* cited by examiner

*Primary Examiner* — Mohamad A Musleh

(57) ABSTRACT

A magnetic field generator including: a yoke; and a plurality of main magnetic pole magnets and a plurality of secondary magnetic pole magnets, the main magnetic pole magnets and the secondary magnetic pole magnets comprising a rare earth sintered magnet, having magnetic pole orientations different from each other by substantially 90°, and being alternately arranged in a linear Halbach magnet array without gaps and fixed to the yoke, wherein near contact surfaces of the main magnetic pole magnets and the secondary magnetic pole magnets, a grain boundary diffusion layer is formed in which at least one of Dy or Tb being heavy rare earth elements or a compound of at least one of the Dy or the Tb is diffused into internal grain boundaries from the contact surfaces.

12 Claims, 8 Drawing Sheets

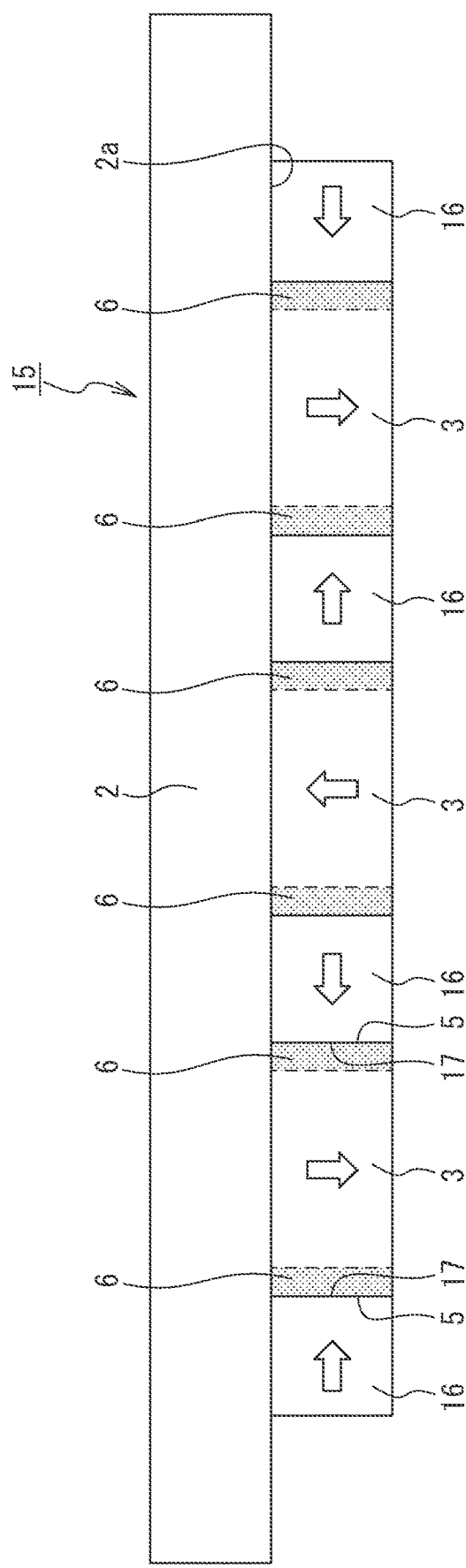

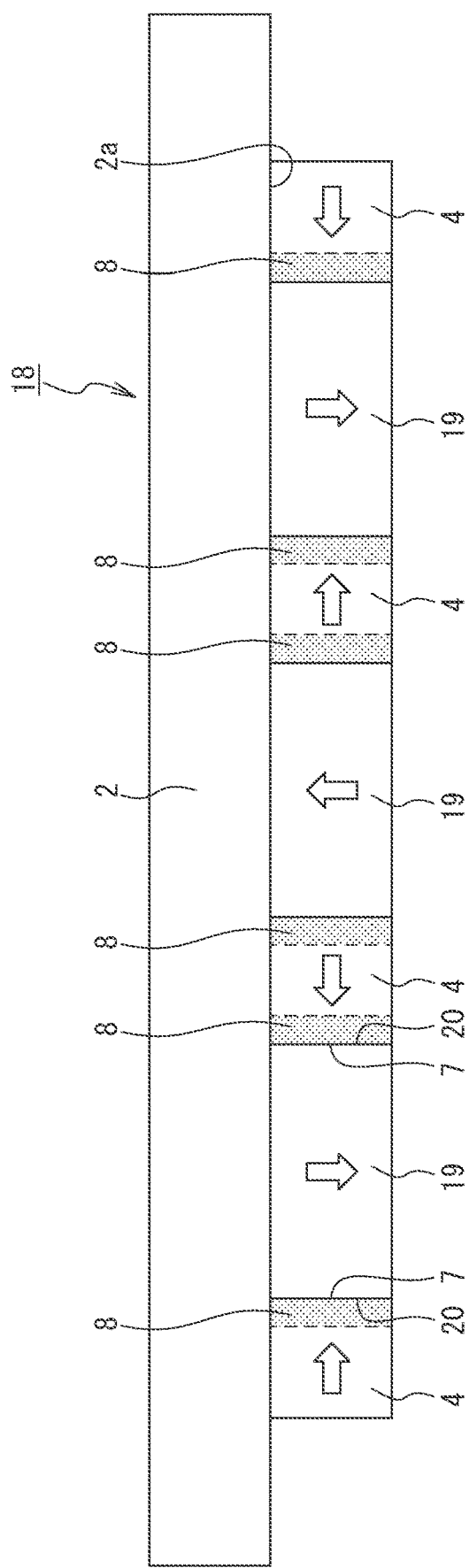

MAGNETIC FIELD GENERATOR, METHOD FOR MANUFACTURING MAGNETIC FIELD GENERATOR, AND LINEAR MOTOR USING MAGNETIC FIELD GENERATOR

CROSS REFERENCE TO RELATED APPLICATIONS AND INCORPORATION BY REFERENCE

This application claims benefit of priority under 35 USC 119 based on Japanese Patent Application No. 2021-37695 filed on Mar. 9, 2021, the entire contents of which are incorporated by reference herein.

TECHNICAL FIELD

The present invention relates to a magnetic field generator, a method for manufacturing a magnetic field generator, and a linear motor using the magnetic field generator.

BACKGROUND ART

Linear motors are used in a variety of applications, such as semiconductor manufacturing equipment and automatic doors, and are highly reliable for their ability to directly achieve linear motion.

With recent improvements in the performance of rare earth permanent magnets, linear motors, which require high trust, have employed, as a stator or mover, a magnetic field generator in which a plurality of rare earth permanent magnets with magnetic pole orientations different from each other by substantially 90° are alternately arranged in a linear Halbach magnet array without gaps and fixed to a yoke.

Linear motors employing the above magnetic field generator can obtain high magnetic flux density compared with those employing a magnetic field generator in which permanent magnets magnetized in opposite directions are alternately arranged, as in the conventional art.

However, in such a magnetic field generator with a Halbach magnet array, since the plurality of permanent magnets are arranged without gaps, the permanent magnets adjacent to each other are always exposed to strong opposite magnetic fields, so that large demagnetization occurs near contact surfaces of the permanent magnets, whereby demagnetization resistance tends to be reduced.

As a method for preventing demagnetization of permanent magnets, one possible method is to use a neodymium sintered magnet having high coercive force that contains large amounts of Dy (dysprosium) and/or Tb (terbium), which are heavy rare earth elements. However, Dy and Tb are expensive, as well as unevenly distributed as resources, due to which the elements are in unstable supply. Additionally, in neodymium sintered magnets with high contents of Dy and/or Tb, residual magnetic flux density is easily reduced, which may lead to thrust reduction when used in a linear motor.

Therefore, in recent years, there have been developed magnetic field generators in which grain boundary diffusion treatment is performed to diffuse Dy and/or Tb or a compound thereof into grain boundaries near the surfaces of permanent magnets, whereby Dy and/or Tb or the compound thereof is unevenly distributed near the grain boundaries being a source of occurrence of demagnetization to obtain permanent magnets having increased coercive force (grain boundary diffusion magnets), and the grain boundary diffusion magnets are arranged in a linear Halbach magnet array (see, for example, PTL 1 and 2).

CITATION LIST

Patent Literature

PTL 1: JP 2010-136516 A
PTL 2: JP 2014-516236 A

SUMMARY OF INVENTION

Technical Problem

However, magnetic field generators using grain boundary diffusion magnets arranged in a linear Halbach magnet array are required to further reduce the amounts of Dy and/or Tb to be used, which are expensive.

Additionally, grain boundary diffusion magnets will expand due to grain boundary diffusion treatment. Therefore, in the magnetic field generators with the Halbach magnet array disclosed in PTL 1 and 2, expansion of the grain boundary diffusion magnets in a direction of the array prevents high precision assembly of the Halbach magnet array.

Accordingly, the present invention has been made in view of the above circumstances. It is an object of the present invention to provide a magnetic field generator that prevents demagnetization resistance from being reduced, a method for manufacturing a magnetic field generator that achieves reduced amounts of dysprosium (Dy) and/or terbium (Tb) to be used and improves assembly precision, and a linear motor having improved thrust characteristics.

Solution to Problem

In order to achieve the above-described object, according to an aspect of the present invention, there is provided a magnetic field generator including: a yoke; and a plurality of main magnetic pole magnets and a plurality of secondary magnetic pole magnets, the main magnetic pole magnets and the secondary magnetic pole magnets comprising a rare earth sintered magnet, having magnetic pole orientations different from each other by substantially 90°, and being alternately arranged in a linear Halbach magnet array without gaps and fixed to the yoke, wherein near contact surfaces of the main magnetic pole magnets and the secondary magnetic pole magnets, a grain boundary diffusion layer is formed in which at least one of Dy or Tb being heavy rare earth elements or a compound of at least one of the Dy or the Tb is diffused into internal grain boundaries from the contact surfaces.

In addition, according to another aspect of the present invention, there is provided a linear motor using the magnetic field generator described above as a mover or stator.

In addition, according to still another aspect of the present invention, there is provided a method for manufacturing a magnetic field generator including: applying a coating material including at least one of Dy or Tb being heavy rare earth elements or a compound of at least one of the Dy or the Tb onto at least either main magnetic pole-side contact surfaces of main magnetic pole magnets in contact with secondary magnetic pole magnets or secondary magnetic pole-side contact surfaces of the secondary magnetic pole magnets in contact with the main magnetic pole magnets; heating at least either the main magnetic pole magnets or the secondary magnetic pole magnets applied with the coating material to form a grain boundary diffusion layer on at least either the main magnetic pole-side contact surfaces or the secondary magnetic pole-side contact surfaces; and alternately arranging the main magnetic pole magnets and the secondary magnetic pole magnets in a linear Halbach magnet array without gaps with the main magnetic pole-side contact surfaces being in contact with the secondary magnetic pole-side contact surfaces so that magnetic pole orientations are different from each other by substantially 90° and fixing the main magnetic pole magnets and the secondary magnetic pole magnets to an arrangement surface of a yoke.

Advantageous Effects of Invention

The magnetic field generator according to the present invention can prevent demagnetization resistance from being reduced. Additionally, the method for manufacturing a magnetic field generator according to the present invention can reduce the amounts of use of dysprosium (Dy) and/or terbium (Tb), which are heavy rare earth elements, and also can improve assembly precision. Furthermore, the linear motor using the magnetic field generator according to the present invention can achieve improved thrust characteristics.

BRIEF DESCRIPTION OF DRAWINGS

FIG. 8 is a diagram illustrating the configuration of a magnetic field generator of a fifth embodiment according to the present invention; and FIG. 9 is a diagram illustrating the configuration of a magnetic field generator of a sixth embodiment according to the present invention.

DESCRIPTION OF EMBODIMENTS

Next, with reference to the accompanying drawings, an embodiment according to the present invention will be described. In the following description of the drawings, the same or similar reference signs are assigned to the same or similar composing elements. However, it should be noted that the drawings are schematic and relations between thicknesses and planar dimensions, ratios among thicknesses of respective layers, and the like are different from actual ones. Therefore, specific thicknesses and dimensions should be determined in consideration of the following description. It should also be noted that the drawings include portions having different dimensional relationships and ratios from each other.

In addition, the embodiment, which will be described below, indicate devices and methods to embody the technical idea of the present invention, and the technical idea of the present invention does not limit the materials, shapes, structures, arrangements, and the like of the constituent components to those described below. The technical idea of the present invention can be subjected to a variety of alterations within the technical scope prescribed by the claims.

First Embodiment

Figure 1:
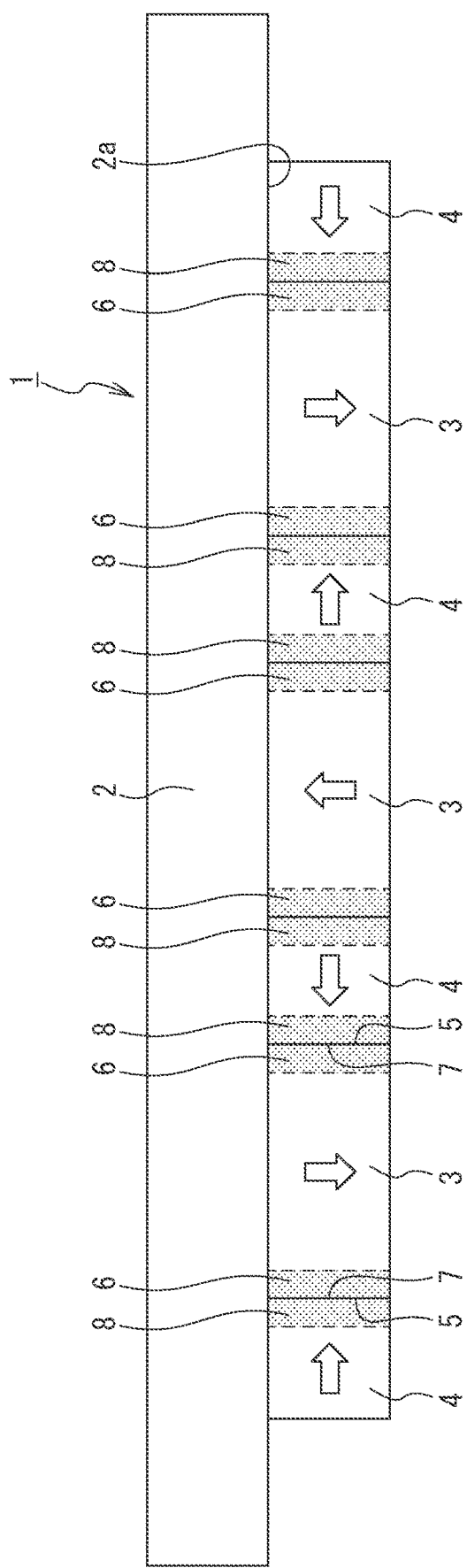
FIG. 1 is a diagram illustrating the configuration of a magnetic field generator of a first embodiment according to the present invention.

FIG. 1 illustrates a magnetic field generator 1 of a first embodiment according to the present invention.

The magnetic field generator 1 includes a yoke 2 made of a soft magnetic material and pluralities of main magnetic pole magnets 3 and secondary magnetic pole magnets 4 each formed into a rectangular parallelepiped shape. The main magnetic pole magnets 3 and the secondary magnetic pole magnets 4 are alternately arranged in a linear Halbach magnet array without gaps so that magnetic pole orientations indicated by white arrow directions are different from each other by substantially 90°, and are attached to an arrangement surface 2a of the yoke 2 with adhesive.

The main magnetic pole magnets 3 and the secondary magnetic pole magnets 4 are formed by a rare earth sintered magnet such as a neodymium sintered magnet. The entire region of a contact surface 5 of each main magnetic pole magnet 3 in contact with each secondary magnetic pole magnet 4 is formed with a main magnetic pole-side grain boundary diffusion layer 6 by grain boundary diffusion treatment. Additionally, the entire region of a contact surface 7 of each secondary magnetic pole magnet 4 in contact with each main magnetic pole magnet 3 is also formed with a secondary magnetic pole-side grain boundary diffusion layer 8 by grain boundary diffusion treatment.

The main magnetic pole-side grain boundary diffusion layers 6 and the secondary magnetic pole-side grain boundary diffusion layers 8 are layers in which at least one of dysprosium (Dy) or Tb (terbium), which are heavy rare earth elements, or a compound of at least one of Dy or Tb is diffused into grain boundaries inside the magnets from the contact surfaces 5 and 7, and the inclusion of at least one of Dy or Tb in the layers increases coercive force near the contact surfaces 5 and 7.

Figure 2:
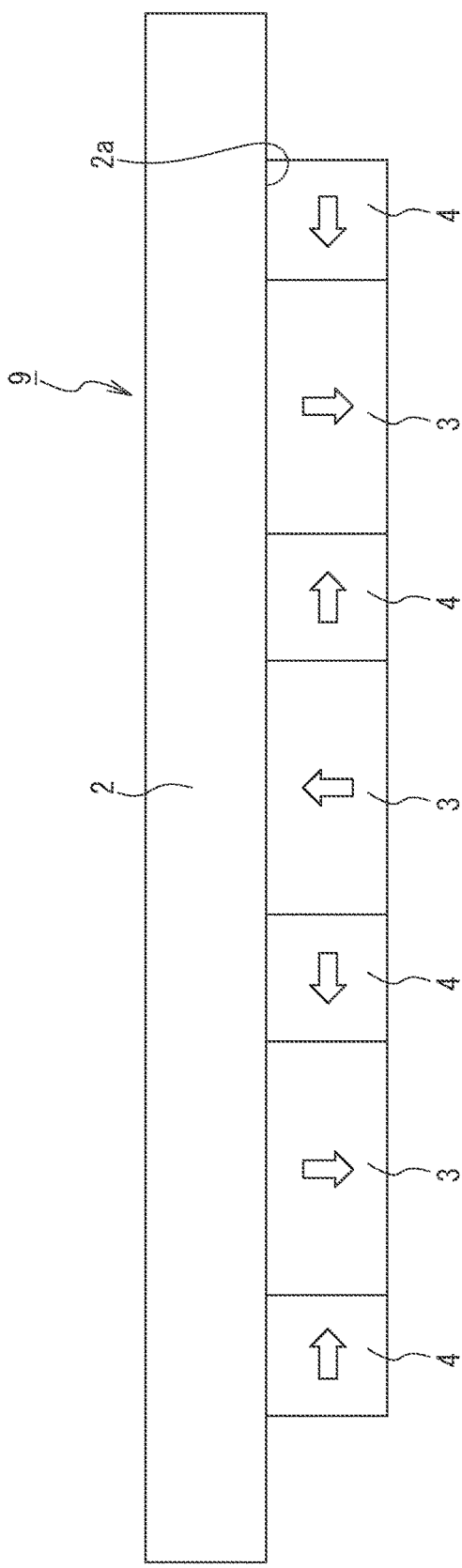
FIG. 2 is a diagram illustrating a conventional magnetic field generator.
Figure 3:
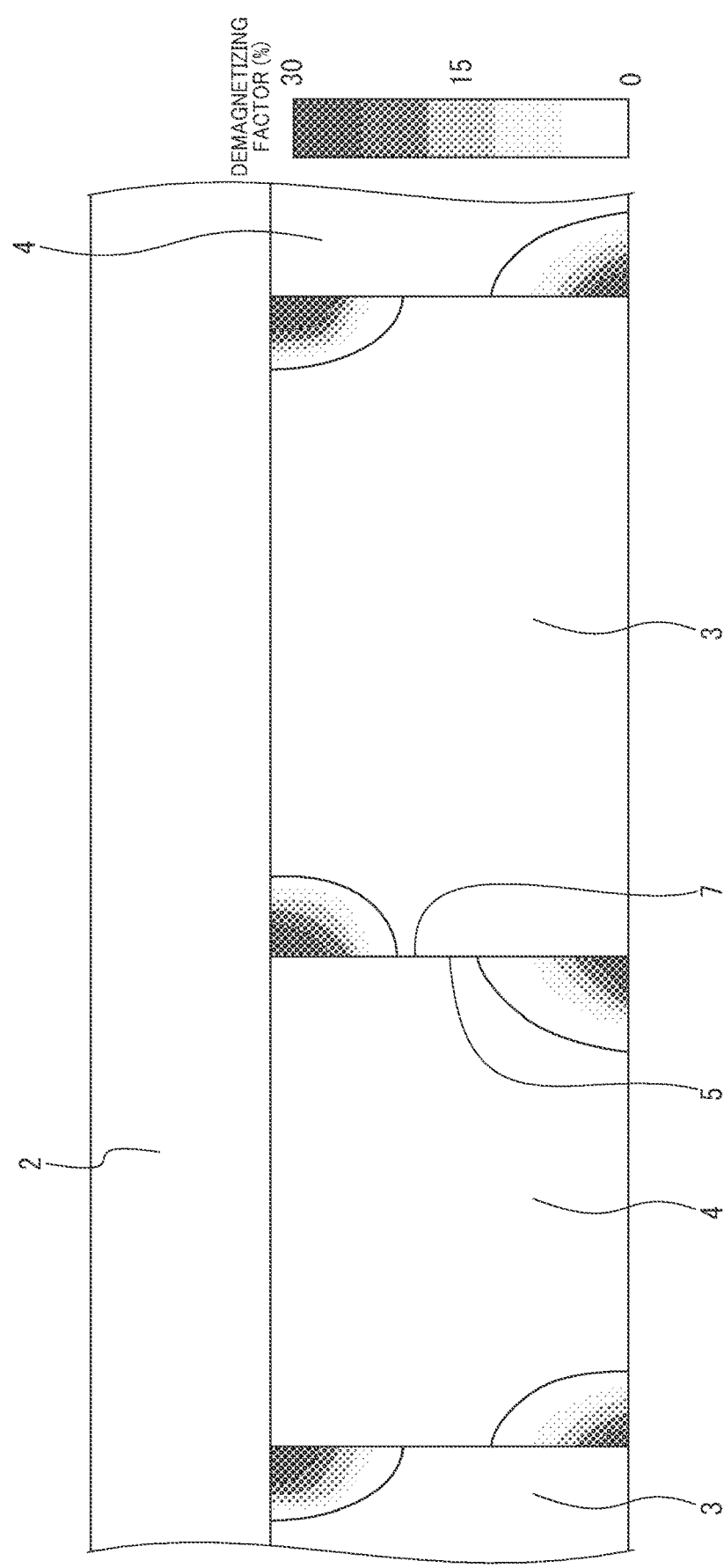
FIG. 3 is a graph illustrating results obtained by performing a demagnetization analysis of the conventional magnetic field generator.

Here, FIG. 2 illustrates a conventional magnetic field generator 9 with a Halbach magnet array. Unlike the first embodiment illustrated in FIG. 1, the contact surfaces 5 and 7 of the main and secondary magnetic pole magnets 3 and 4 are not provided with the main magnetic pole-side grain boundary diffusion layers 6 and the secondary magnetic pole-side grain boundary diffusion layers 8. Additionally, FIG. 3 illustrates an example where a demagnetization analysis of the conventional magnetic field generator 9 was performed. As can be seen in FIG. 3, in the conventional magnetic field generator 9, the main magnetic pole magnets 3 and the secondary magnetic pole magnets 4 are arranged without gaps, due to which demagnetization occurs near the contact surfaces 5 and 7. Particularly, large demagnetization occurs at end portions of the contact surfaces 5 and 7. Moreover, such regions that cause demagnetization are in an incompletely magnetized state, so that demagnetization proceeds when the regions are exposed again to an opposite magnetic field due to current or stress such as heat.

On the other hand, in contrast to the conventional magnetic field generator 9 illustrated in FIG. 2, the magnetic field generator 1 of the first embodiment includes the main magnetic pole-side grain boundary diffusion layers 6 formed on the contact surfaces 5 of the main magnetic pole magnets 3 where demagnetization occurs and the secondary magnetic pole-side grain boundary diffusion layers 8 formed on the contact surfaces 7 of the secondary magnetic pole magnets 4 where demagnetization occurs. The inclusion of at least one of Dy or Tb in the layers increases the coercive force near the contact surfaces 5 and 7, which can thus provide the magnetic field generator 1 that prevents demagnetization resistance from being reduced.

In addition, when the magnetic field generator 1 of the first embodiment is used as a stator or mover of a linear motor, the at least one of Dy or Tb included in the main magnetic pole-side grain boundary diffusion layers 6 and the secondary magnetic pole-side grain boundary diffusion layers 8 does not reduce residual magnetic flux densities inside the main and secondary magnetic pole magnets 3 and 4 comprising a neodymium sintered magnet, thus allowing for improved thrust of the linear motor.

Second Embodiment

Next, a method for manufacturing the magnetic field generator 1 according to a second embodiment will be described with reference to a flowchart of FIG. 4.

First, a fluoride coating material that includes at least one of Dy or Tb or includes a compound of at least one of Dy or Tb is applied onto the contact surfaces 5 of the main magnetic pole magnets 3 and the contact surfaces 7 of the secondary magnetic pole magnets 4 (step ST1).

Next, the pluralities of main and secondary magnetic pole magnets 3 and 4 applied with the coating material are subjected to a grain boundary diffusion treatment by heating under predetermined conditions to form the main magnetic pole-side grain boundary diffusion layers 6 on the entire regions of the contact surfaces 5 of the main magnetic pole magnets 3 and form the secondary magnetic pole-side grain boundary diffusion layers 8 on the entire regions of the contact surfaces 7 of the secondary magnetic pole magnets 4 (step ST2). It should be noted that the heating conditions for the grain boundary diffusion treatment are determined appropriately according to the material and amount of the coating material to be applied, sizes of the main and secondary magnetic pole magnets 3 and 4, and the like.

Next, an adhesive is applied onto surfaces to be attached to the yoke 2 of the plurality of main magnetic pole magnets 3 subjected to the grain boundary diffusion treatment by coating application and heating. Then, the plurality of main magnetic pole magnets 3 are attached to the arrangement surface 2a of the yoke 2 while leaving intervals for arranging the secondary magnetic pole magnets 4. Next, the adhesive is applied onto surfaces to be attached to the yoke 2 of the plurality of secondary magnetic pole magnets 4 subjected to the grain boundary diffusion treatment by coating application and heating. Then, the secondary magnetic pole magnets 4 are attached to the arrangement surface 2a of the yoke 2 between the plurality of main magnetic pole magnets 3 to assemble the magnetic field generator 1 in which all the main and secondary magnetic pole magnets 3 and 4 are arranged in a Halbach magnet array (step ST3).

Here, at step ST2, when performing the grain boundary diffusion treatment of the main and secondary magnetic pole magnets 3 and 4, the main and secondary magnetic pole magnets 3 and 4 expand due to the heating. In the expansion of the main and secondary magnetic pole magnets 3 and 4 due to the heating, expansion coefficient in a direction (in-plane direction) along the contact surfaces 5 and 7 applied with the coating material is dominant, whereas expansion coefficient in a direction orthogonal to the contact surfaces 5 and 7 is small.

Thus, according to the method for manufacturing the magnetic field generator 1 described above, the main and secondary magnetic pole magnets 3 and 4 subjected to the grain boundary diffusion treatment by applying the coating material onto the contact surfaces 5 and 7 and heating are almost unchanged in size in the direction orthogonal to the contact surfaces 5 and 7 (a direction in which the main and secondary magnetic pole magnets 3 and 4 are adjacent). Accordingly, the magnetic field generator 1 with the Halbach magnet array can be assembled with high precision.

Additionally, as the yoke 2, a soft magnetic structural material such as SS-400, a laminated non-directional electromagnetic steel sheet, or the like can be used. Here, with the use of the Halbach magnet array, magnetic flux is concentrated on a gap surface side. Therefore, it is also possible to omit the yoke 2 or form the yoke 2 with a non-magnetic material, from the viewpoint of the magnetic circuit. However, using the yoke 2 made of a soft magnetic material allows the main magnetic pole magnets 3 to be magnetically attracted to the arrangement surface 2a of the yoke 2. Therefore, the yoke 2 made of a soft magnetic material is preferably used in order to improve productivity and durability.

Third Embodiment

Figure 5:
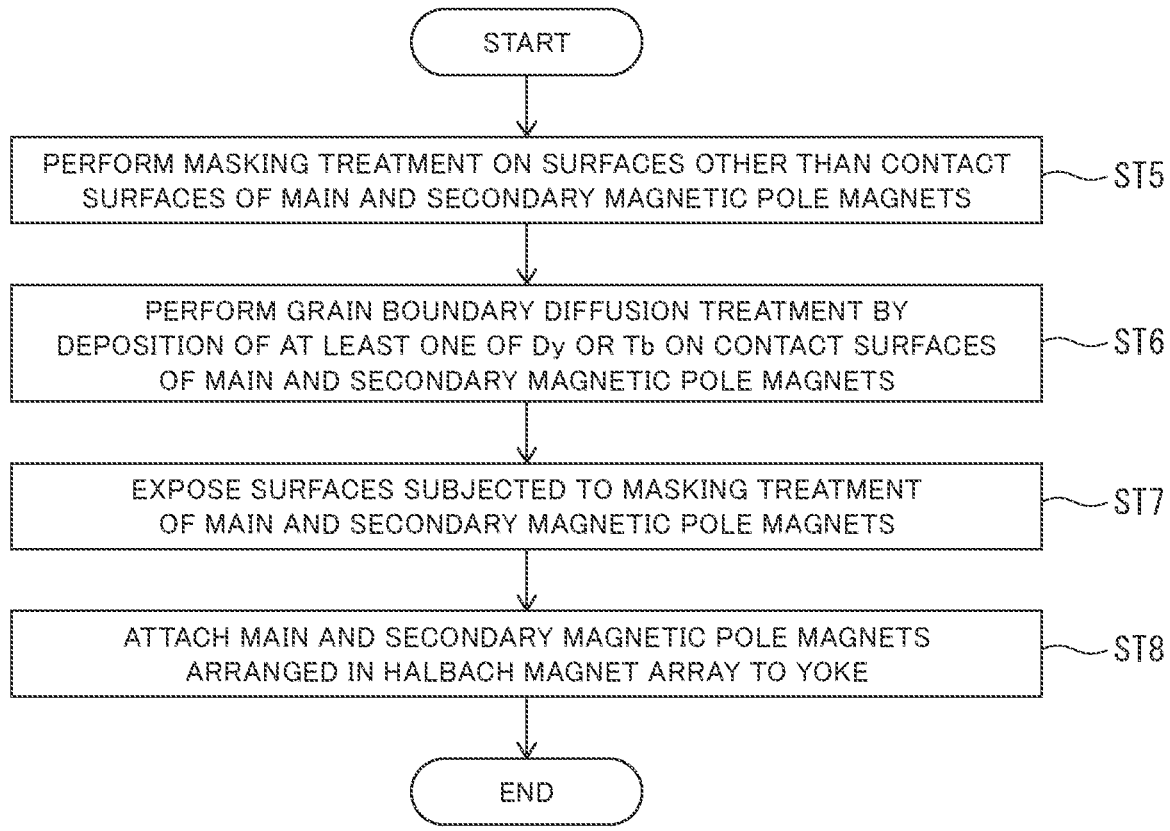
FIG. 5 is a flowchart illustrating a method for manufacturing a magnetic field generator of a third embodiment according to the present invention.

FIG. 5 is a flowchart illustrating a method for manufacturing the magnetic field generator 1 according to a third embodiment.

In the present embodiment, first, masking treatment is performed on surfaces other than the contact surfaces 5 of the main magnetic pole magnets 3, and is also performed on surfaces other than the contact surfaces 7 of the secondary magnetic pole magnets 4 (step ST5). It should be noted that the material and thickness of the masking treatment can be any material and thickness as long as it is possible to prevent grain boundary diffusion treatment using Dy and/or Tb from proceeding onto the surfaces other than the contact surfaces 5 and 7.

Next, the main magnetic pole magnets 3 and the secondary magnetic pole magnets 4 subjected to the masking treatment are placed into a deposition furnace. Then, in the deposition furnace, at least one of Dy or Tb, or a compound of at least one of Dy or Tb is heated and generated as steam to form the main magnetic pole-side grain boundary diffusion layers 6 on the entire regions of the contact surfaces 5 not subjected to the masking treatment of the main magnetic pole magnets 3 and form the secondary magnetic pole-side grain boundary diffusion layers 8 on the entire regions of the contact surfaces 7 not subjected to the masking treatment of the secondary magnetic pole magnets 4 (step ST6).

Next, the surfaces subjected to the masking treatment of the main and secondary magnetic pole magnets 3 and 4 taken out from the deposition furnace are exposed (step ST7).

Next, an adhesive is applied to the surfaces to be attached to the yoke 2 of the plurality of main magnetic pole magnets 3 subjected to the grain boundary diffusion treatment by the deposition. Then, the plurality of main magnetic pole magnets 3 are attached to the arrangement surface 2a of the yoke 2 while leaving intervals for arranging the secondary magnetic pole magnets 4. Next, the adhesive is applied to the surfaces to be attached to the yoke 2 of the plurality of secondary magnetic pole magnets 4 subjected to the grain boundary diffusion treatment by the deposition. Then, the plurality of secondary magnetic pole magnets 4 are attached to the arrangement surface 2a of the yoke 2 between the plurality of main magnetic pole magnets 3 to assemble the magnetic field generator 1 in which all the main and secondary magnetic pole magnets 3 and 4 are arranged in a Halbach magnet array (step ST8).

Here, at step ST6, even when the grain boundary diffusion treatment of the main and secondary magnetic pole magnets 3 and 4 by the deposition is performed, the expansion coefficient in the direction orthogonal to the deposited contact surfaces 5 and 7 of the main and secondary magnetic pole magnets 3 and 4 is small.

Accordingly, even in the method for manufacturing the magnetic field generator 1 according to the third embodiment described above, the main and secondary magnetic pole magnets 3 and 4 in which the contact surfaces 5 and 7 have been subjected to the grain boundary diffusion treatment by the deposition are unchanged in size in the direction orthogonal to the contact surfaces 5 and 7 (the direction in which the main and secondary magnetic pole magnets 3 and 4 are adjacent). Thus, the magnetic field generator 1 with the Halbach magnet array can be assembled with high precision.

Fourth Embodiment

Figure 6:
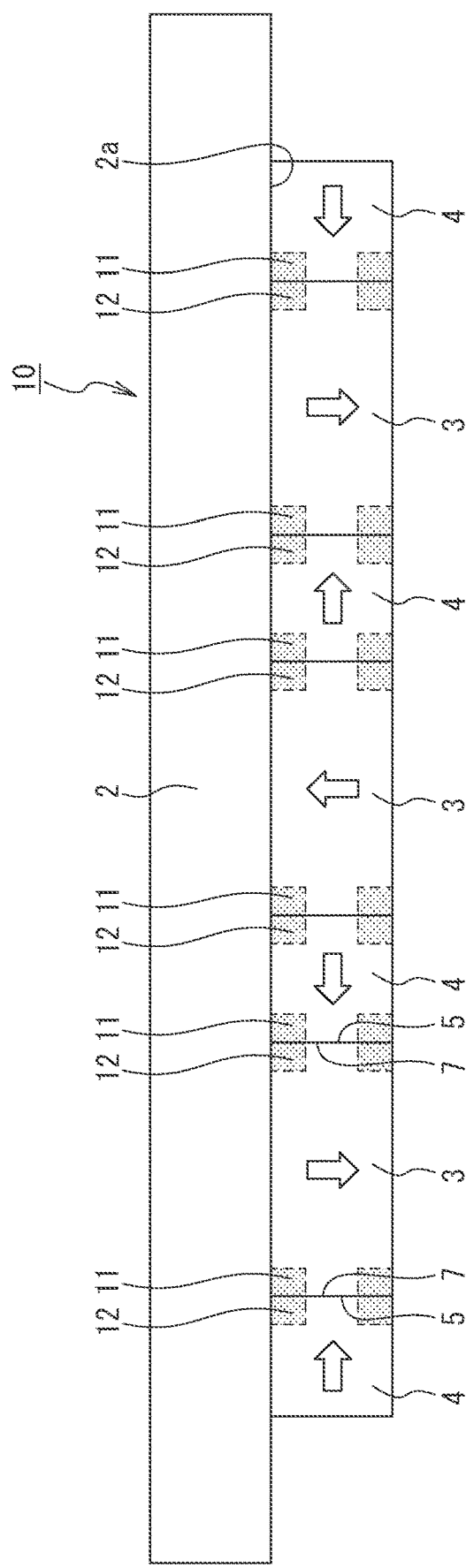
FIG. 6 is a diagram illustrating the configuration of a magnetic field generator of a fourth embodiment according to the present invention.
Figure 7A:
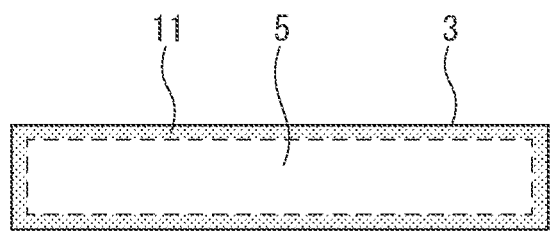
FIGS. 7A and 7B are diagrams illustrating a main magnetic pole-side grain boundary diffusion layer formed near a contact surface of a main magnetic pole magnet and a secondary magnetic pole-side grain boundary diffusion layer formed near a contact surface of a secondary magnetic pole magnet in the fourth embodiment according to the present invention, respectively.
Figure 7B:
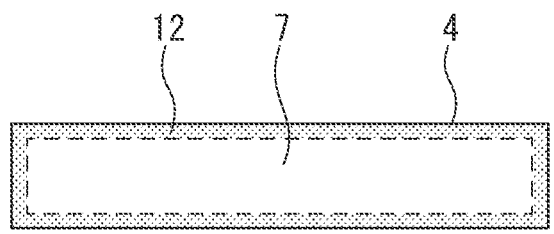

Next, FIGS. 6, 7A and 7B illustrate a magnetic field generator 10 of a fourth embodiment according to the present invention. Note that the same components as those illustrated in FIG. 1 are denoted by the same reference signs, and description thereof will be omitted.

The magnetic field generator 10 of the fourth embodiment is different from the magnetic field generator 1 of the first embodiment in that, as illustrated in FIG. 7A, a main magnetic pole-side grain boundary diffusion layer 11 is formed on an annular region at the end portion of the contact surface 5 of each main magnetic pole magnet 3 by a grain boundary diffusion treatment, and, as illustrated in FIG. 7B, a secondary magnetic pole-side grain boundary diffusion layer 12 is formed on an annular region at the end portion of the contact surface 7 of each secondary magnetic pole magnet 4 by the grain boundary diffusion treatment. These main and secondary magnetic pole-side grain boundary diffusion layers 11 and 12 are layers in which at least one of Dy or Tb, or a compound of at least one of Dy or Tb is diffused into grain boundaries inside the magnets from the end portions of the contact surfaces 5 and 7, as in the first and second embodiments.

As described in FIG. 3, in the conventional magnetic field generator 9 with the Halbach magnet array, large demagnetization occurs at the end portions of the contact surfaces 5 and 7. On the other hand, in the magnetic field generator 10 of the present embodiment, the main magnetic pole-side grain boundary diffusion layer 11 is formed on the annular region at the end portion of the contact surface 5 of each main magnetic pole magnet 3, and the secondary magnetic pole-side grain boundary diffusion layer 12 is formed on the annular region at the end portion of the contact surface 7 of each secondary magnetic pole magnet 4. The inclusion of at least one of Dy or Tb in the main and secondary magnetic pole-side grain boundary diffusion layers 11 and 12 increases the coercive force near the contact surfaces 5 and 7, which can thus provide the magnetic field generator 10 that prevents demagnetization resistance from being reduced.

Additionally, in the magnetic field generator 10 of the present embodiment, the amounts of Dy and/or Tb to be used can be reduced compared with the magnetic field generator 1 of the first embodiment since the main magnetic pole-side grain boundary diffusion layers 11 are formed on the annular regions at the end portions of the contact surfaces 5 of the main magnetic pole magnets 3, and the secondary magnetic pole-side grain boundary diffusion layers 12 are formed on the annular regions at the end portions of the contact surfaces 7 of the secondary magnetic pole magnets 4.

Figure 4:
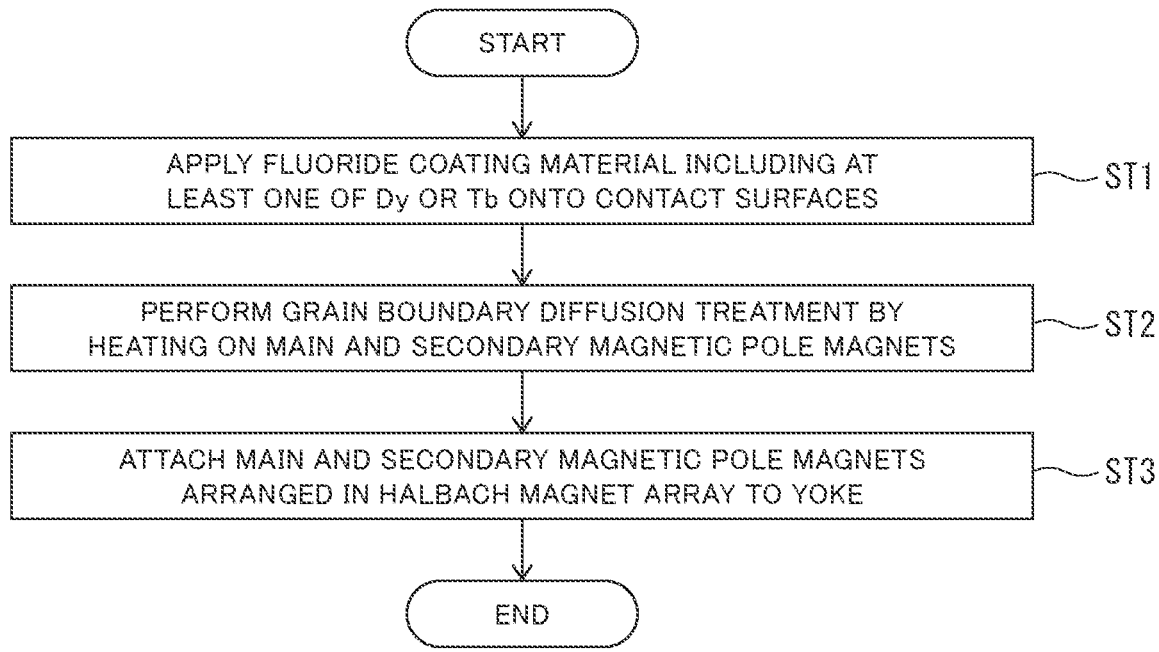
FIG. 4 is a flowchart illustrating a method for manufacturing a magnetic field generator of a second embodiment according to the present invention.

Here, in the present embodiment, the main magnetic pole-side grain boundary diffusion layers 11 on the annular regions at the end portions of the contact surfaces 5 of the main magnetic pole magnets 3 and the secondary magnetic pole-side grain boundary diffusion layers 12 on the annular regions at the end portions of the contact surfaces 7 of the secondary magnetic pole magnets 4 are formed by the grain boundary diffusion treatment by coating application and heating illustrated in FIG. 4 or the grain boundary diffusion treatment by deposition illustrated in FIG. 5.

Fifth Embodiment

Next, FIG. 8 illustrates a magnetic field generator 15 of a fifth embodiment according to the present invention.

The magnetic field generator 15 of the fifth embodiment is different from the magnetic field generator 1 of the first embodiment in that the former includes secondary magnetic pole magnets 16 comprising a rare earth sintered magnet such as a neodymium sintered magnet including at least one of Dy or Tb. In addition, the main magnetic pole magnets 3 are formed by a rare earth sintered magnet such as a neodymium sintered magnet including neither Dy nor Tb.

The main magnetic pole magnets 3 and the secondary magnetic pole magnets 16 of the present embodiment are alternately arranged in a linear Halbach magnet array without gaps so that magnetic pole orientations are different from each other by substantially 90°, and are arranged on the arrangement surface 2a of the yoke 2.

Additionally, the main magnetic pole-side grain boundary diffusion layers 6 are formed on the entire regions of the contact surfaces 5 of the main magnetic pole magnets 3 by grain boundary diffusion treatment, and are in contact with contact surfaces 17 of the secondary magnetic pole magnets 16.

The main magnetic pole-side grain boundary diffusion layers 6 are layers in which at least one of Dy or Tb, or a compound of at least one of Dy or Tb is diffused, as in the first embodiment.

In the magnetic field generator 15 of the present embodiment, the main magnetic pole-side grain boundary diffusion layers 6 are formed on the entire regions of the contact surfaces 5 of the main magnetic pole magnets 3, and the secondary magnetic pole magnets 16 are formed by a rare earth sintered magnet including at least one of Dy or Tb. Therefore, coercive force near the contact surfaces 5 of the main magnetic pole magnets 3 and the contact surfaces 17 of the secondary magnetic pole magnets 16 increases, which can prevent demagnetization resistance from being reduced.

In addition, the main magnetic pole-side grain boundary diffusion layers 6 of the main magnetic pole magnets 3 are formed by the grain boundary diffusion treatment by coating application and heating illustrated in FIG. 4 (the second embodiment) or the grain boundary diffusion treatment by deposition illustrated in FIG. 5 (the third embodiment). However, in the magnetic field generator 15 of the present embodiment, manufacturing cost of the magnetic field generator 15 can be reduced compared with the magnetic field generator 1 of the first embodiment since there is no need to perform grain boundary diffusion treatment on the secondary magnetic pole magnets 16.

Moreover, as in the fourth embodiment, when the main magnetic pole-side grain boundary diffusion layers 11 are formed only on the annular regions at the end portions of the contact surfaces 5 of the main magnetic pole magnets 3, the amounts of Dy and/or Tb to be used are reduced, so that the manufacturing cost of the magnetic field generator 15 can be further reduced.

Sixth Embodiment

Furthermore, FIG. 9 illustrates a magnetic field generator 18 of a sixth embodiment according to the present invention.

The magnetic field generator 18 of the sixth embodiment is different from the magnetic field generator 1 of the first embodiment in that the former includes main magnetic pole magnets 19 formed by a rare earth sintered magnet such as a neodymium sintered magnet including at least one of Dy or Tb. Additionally, the secondary magnetic pole magnets 4 are formed by a rare earth sintered magnet such as a neodymium sintered magnet including neither Dy nor Tb.

The main magnetic pole magnets 19 and the secondary magnetic pole magnets 4 of the present embodiment are alternately arranged in a linear Halbach magnet array without gaps so that magnetic pole orientations are different from each other by substantially 90°, and are arranged on the arrangement surface 2a of the yoke 2.

In addition, the secondary magnetic pole-side grain boundary diffusion layers 8 are formed on the entire regions of the contact surfaces 7 of the secondary magnetic pole magnets 4 by grain boundary diffusion treatment, and are in contact with contact surfaces 20 of the main magnetic pole magnets 19.

The secondary magnetic pole-side grain boundary diffusion layers 8 are layers in which at least one of Dy or Tb, or a compound of at least one of Dy or Tb is diffused, as in the first embodiment.

In the magnetic field generator 18 of the present embodiment, the secondary magnetic pole-side grain boundary diffusion layers 8 are formed on the entire regions of the contact surfaces 7 of the secondary magnetic pole magnets 4, and the main magnetic pole magnets 19 are formed by a rare earth sintered magnet including at least one of Dy or Tb. Therefore, coercive force near the contact surfaces 20 of the main magnetic pole magnets 19 and the contact surfaces 7 of the secondary magnetic pole magnets 4 increases, which can prevent demagnetization resistance from being reduced.

Additionally, the secondary magnetic pole-side grain boundary diffusion layers 8 of the secondary magnetic pole magnets 4 are formed by the grain boundary diffusion treatment by coating application and heating illustrated in FIG. 4 (the second embodiment) or the grain boundary diffusion treatment by deposition illustrated in FIG. 5 (the third embodiment). However, in the magnetic field generator 18 of the present embodiment, manufacturing cost of the magnetic field generator 18 can be reduced compared with the magnetic field generator 1 of the first embodiment since there is no need to perform grain boundary diffusion treatment on the main magnetic pole magnets 19.

Furthermore, as in the fourth embodiment, when the secondary magnetic pole-side grain boundary diffusion layers 12 are formed only on the annular regions at the end portions of the contact surfaces 7 of the secondary magnetic pole magnets 4, the amounts of Dy and/or Tb to be used are reduced, so that the manufacturing cost of the magnetic field generator 18 can be further reduced.

REFERENCE SIGNS LIST 1, 15, 10, 18: Magnetic field generator
2: Yoke
2a: Arrangement surface
3, 19: Main magnetic pole magnet
4, 16: Secondary magnetic pole magnet
5, 20: Contact surface of main magnetic pole magnet
6, 11: Main magnetic pole-side grain boundary diffusion layer (grain boundary diffusion layer)
7, 17: Contact surface of secondary magnetic pole magnet
8, 12: Secondary magnetic pole-side grain boundary diffusion layer (grain boundary diffusion layer)

The invention claimed is:

1. A magnetic field generator comprising:
a yoke; and
a plurality of main magnetic pole magnets and a plurality of secondary magnetic pole magnets, the main magnetic pole magnets and the secondary magnetic pole magnets comprising a rare earth sintered magnet, having magnetic pole orientations different from each other by substantially 90°, and being alternately arranged in a linear Halbach magnet array without gaps and fixed to the yoke,
wherein near contact surfaces of the main magnetic pole magnets and the secondary magnetic pole magnets, a grain boundary diffusion layer is formed in which at least one of Dy or Tb being heavy rare earth elements or a compound of at least one of the Dy or the Tb is diffused into internal grain boundaries from the contact surfaces.

2. The magnetic field generator according to claim 1, wherein the grain boundary diffusion layer is formed on both main magnetic pole-side contact surfaces of the main magnetic pole magnets in contact with the secondary magnetic pole magnets and secondary magnetic pole-side contact surfaces of the secondary magnetic pole magnets in contact with the main magnetic pole magnets.

3. The magnetic field generator according to claim 1, wherein the grain boundary diffusion layer is formed on either main magnetic pole-side contact surfaces of the main magnetic pole magnets in contact with the secondary magnetic pole magnets or secondary magnetic pole-side contact surfaces of the secondary magnetic pole magnets in contact with the main magnetic pole magnets; and wherein either the main magnetic pole magnets or the secondary magnetic pole magnets not formed with the grain boundary diffusion layer are formed by the rare earth sintered magnet including the at least one of the Dy or the Tb.

4. The magnetic field generator according to claim 2, wherein the grain boundary diffusion layer is formed at end portions of the main magnetic pole-side contact surfaces or the secondary magnetic pole-side contact surfaces.

5. A linear motor using the magnetic field generator according to claim 1 as a mover or stator.

6. A method for manufacturing a magnetic field generator comprising:
applying a coating material including at least one of Dy or Tb being heavy rare earth elements or a compound of at least one of the Dy or the Tb onto at least either main magnetic pole-side contact surfaces of main magnetic pole magnets in contact with secondary magnetic pole magnets or secondary magnetic pole-side contact surfaces of the secondary magnetic pole magnets in contact with the main magnetic pole magnets;

heating at least either the main magnetic pole magnets or the secondary magnetic pole magnets applied with the coating material to form a grain boundary diffusion layer on at least either the main magnetic pole-side contact surfaces or the secondary magnetic pole-side contact surfaces; and alternately arranging the main magnetic pole magnets and the secondary magnetic pole magnets in a linear Halbach magnet array without gaps with the main magnetic pole-side contact surfaces being in contact with the secondary magnetic pole-side contact surfaces so that magnetic pole orientations are different from each other by substantially 90° and fixing the main magnetic pole magnets and the secondary magnetic pole magnets to an arrangement surface of a yoke.

7. A method for manufacturing a magnetic field generator comprising:

performing masking treatment on regions other than a position where a grain boundary diffusion layer is formed on at least either main magnetic pole-side contact surfaces of main magnetic pole magnets in contact with secondary magnetic pole magnets or secondary magnetic pole-side contact surfaces of the secondary magnetic pole magnets in contact with the main magnetic pole magnets;

placing at least either the main magnetic pole magnets or the secondary magnetic pole magnets subjected to the masking treatment in a deposition furnace and heating at least one of Dy or Tb being heavy rare earth elements or a compound of at least one of the Dy or the Tb to generate as steam and form a grain boundary diffusion layer on at least either the main magnetic pole-side contact surfaces or the secondary magnetic pole-side contact surfaces;

exposing the regions subjected to the masking treatment of at least either the main magnetic pole magnets or the secondary magnetic pole magnets; and alternately arranging the main magnetic pole magnets and the secondary magnetic pole magnets in a linear Halbach magnet array without gaps with the main magnetic pole-side contact surfaces being in contact with the secondary magnetic pole-side contact surfaces so that magnetic pole orientations are different from each other by substantially 90° and fixing the main magnetic pole magnets and the secondary magnetic pole magnets to an arrangement surface of a yoke.

8. The method for manufacturing a magnetic field generator according to claim 6, wherein the grain boundary diffusion layer is formed at end portions of the main magnetic pole-side contact surfaces or the secondary magnetic pole-side contact surfaces.

9. The method for manufacturing a magnetic field generator according to claim 6, wherein the yoke is formed by a soft magnetic material, in which of the main magnetic pole magnets and the secondary magnetic pole magnets arranged in the Halbach magnet array, the main magnetic pole magnets are fixed to the yoke by magnetic attraction.

10. The magnetic field generator according to claim 3, wherein the grain boundary diffusion layer is formed at end portions of the main magnetic pole-side contact surfaces or the secondary magnetic pole-side contact surfaces.

11. The method for manufacturing a magnetic field generator according to claim 7, wherein the grain boundary diffusion layer is formed at end portions of the main magnetic pole-side contact surfaces or the secondary magnetic pole-side contact surfaces.

12. The method for manufacturing a magnetic field generator according to claim 7, wherein the yoke is formed by a soft magnetic material, in which of the main magnetic pole magnets and the secondary magnetic pole magnets arranged in the Halbach magnet array, the main magnetic pole magnets are fixed to the yoke by magnetic attraction.

* * * * *